United States Patent
Dong et al.

(10) Patent No.: US 11,481,689 B2
(45) Date of Patent: Oct. 25, 2022

(54) PLATFORMS FOR DEVELOPING DATA MODELS WITH MACHINE LEARNING MODEL

(71) Applicant: Industrial Artificial Intelligence Inc., Palo Alto, CA (US)

(72) Inventors: Wei Dong, Ann Arbor, MI (US); Siming Li, Palo Alto, CA (US)

(73) Assignee: Industrial Artificial Intelligence Inc., Palo Alto, CA (US)

(*) Notice: Subject to any disclaimer, the term of this patent is extended or adjusted under 35 U.S.C. 154(b) by 988 days.

(21) Appl. No.: 16/216,786

(22) Filed: Dec. 11, 2018

(65) Prior Publication Data
US 2020/0184379 A1    Jun. 11, 2020

(51) Int. Cl.
| | |
|---|---|
| *G06N 20/10* | (2019.01) |
| *G06F 8/36* | (2018.01) |
| *G06K 9/62* | (2022.01) |
| *G06N 3/08* | (2006.01) |
| *G06F 16/901* | (2019.01) |
| *G06F 8/77* | (2018.01) |
| *G06F 8/10* | (2018.01) |
| *G06F 9/455* | (2018.01) |

(52) U.S. Cl.
CPC .............. *G06N 20/10* (2019.01); *G06F 8/10* (2013.01); *G06F 8/36* (2013.01); *G06F 8/77* (2013.01); *G06F 9/45558* (2013.01); *G06F 16/9027* (2019.01); *G06K 9/6256* (2013.01); *G06N 3/084* (2013.01); *G06F 2009/45575* (2013.01)

(58) Field of Classification Search
CPC .......... G06F 16/9027; G06F 8/10; G06F 8/36; G06F 8/77; G06F 9/45558; G06F 2009/45575; G06N 3/084
USPC ...................................................... 706/12–45
See application file for complete search history.

(56) References Cited

U.S. PATENT DOCUMENTS

| | | | | |
|---|---|---|---|---|
| 8,239,335 B2* | 8/2012 | Schmidtler | ............ | G06N 20/10 706/15 |
| 8,510,238 B1* | 8/2013 | Aradhye | ................ | H04W 4/50 706/12 |

(Continued)

OTHER PUBLICATIONS

Peckham et al, "Semantic Data Models", ACM, pp. 1-37 (Year: 1988).*

(Continued)

*Primary Examiner* — Anil Khatri
(74) *Attorney, Agent, or Firm* — Fenwick & West LLP

(57) ABSTRACT

A platform for developing data models includes a repository for kernel images, a data store of data sets and a development environment. The kernel images include a data model and configurable development code for developing the data model. The development of the data model is configurable according to development parameters for the development code. The kernel images specify the development parameters in a standardized syntax for the platform and specify the input data using standardized data types for the platform, preferably via a standardized API. The development environment is used to run sessions to develop the data models. Each session runs one of the kernel images, according to a configuration of the development parameters for the kernel image, and using one of the data sets in the data store as input data.

20 Claims, 8 Drawing Sheets

(56) References Cited

U.S. PATENT DOCUMENTS

| | | | | |
|---|---|---|---|---|
| 8,719,197 | B2* | 5/2014 | Schmidtler | G06F 16/93 706/15 |
| 8,768,659 | B2* | 7/2014 | Vasudevan | G06F 17/18 703/2 |
| 9,818,136 | B1* | 11/2017 | Hoffberg | G07F 17/32 |
| 9,984,315 | B2* | 5/2018 | Gaidon | G06V 30/194 |
| 10,242,285 | B2* | 3/2019 | Thrasher | G06V 10/457 |
| 10,755,142 | B2* | 8/2020 | Saliou | G06V 10/255 |
| 10,909,188 | B2* | 2/2021 | Lundberg | G06K 9/6256 |
| 10,915,829 | B1* | 2/2021 | Wani | G01V 1/008 |
| 10,956,825 | B1* | 3/2021 | Chen | G06N 5/04 |
| 11,094,029 | B2* | 8/2021 | Kalamkar | G06T 1/20 |
| 11,120,364 | B1* | 9/2021 | Gokalp | G06N 20/00 |
| 11,137,289 | B1* | 10/2021 | Poli | G01B 9/02049 |
| 11,256,989 | B2* | 2/2022 | Dalli | G06N 5/003 |

OTHER PUBLICATIONS

Janssen et al, "Generating User Interfaces from Data Models and Dialogue Net Specifications", ACM, pp. 418-423 (Year: 1993).*

Koegel et al, "Comparing State- and Operation-based Change Tracking on Models", IEEE, pp. 163-172 (Year: 2010).*

Zhang et al, "Toward a Reliable Collection of Eye-Tracking Data for Image Quality Research: Challenges, Solutions, and Applications", IEEE, pp. 2424-2487 (Year: 2017).*

Takeda et al, "Robust Kernel Regression for Restoration and Reconstruction of Images From Sparse Noisy Data", IEEE, 1257-1260 (Year: 2006).*

Grangier et al, "A Discriminative Kernel-Based Model to Rank Images from Text Queries", IEEE, pp. 1371-1384 (Year: 2008).*

Salah et al, "Effective Level Set Image Segmentation With a Kernel Induced Data Term", IEEE, pp. 1371-1384 (Year: 2010).*

* cited by examiner

PLATFORMS FOR DEVELOPING DATA MODELS WITH MACHINE LEARNING MODEL

BACKGROUND

1. Technical Field

This disclosure relates generally to the development of data models, such as the training of machine learning models.

2. Description of Related Art

As the amount of available data increases and the availability of computing power to process that data also increases, data scientists are building more and more complex data models. However, the effort required to develop a data model is not trivial.

Take machine learning as an example. The data scientist must select from many different architectures and, given an architecture, a large number of weights and other variables must be optimized. This is typically done using an iterative process that consumes a large amount of data. For example, if a machine learning model is being developed to predict or diagnose lung cancer from CT images, cancerous and normal CT images and other patient data are collected and used to iteratively train a machine learning model. The architecture of the machine learning model itself is also optimized over time. The data scientist experiments with different architectures: different types of pre-processing, different machine learning methods, and different types of post-processing, to name some of the different options. The data scientist also experiments with different parameters for the experiments themselves: number of iterations, learning rate, and feedback method, for example. The data scientist may run a series of experiments with a given architecture, learn from the results, revise the architecture, and repeat this cycle many many times. Furthermore, the development effort often is not linear. The data scientist may explore one path of potential improvements only to decide that it is not fruitful and then have to backtrack to an earlier point in the development in order to explore a different path.

The development effort may take weeks, months or longer. Over that time period, the data scientist may not keep good records and often will not remember what happened in earlier experiments. As a result, he may repeat or spend unnecessary time recreating earlier experiments. For example, a data scientist may want to combine the useful characteristics developed over one set of experiments with different useful characteristics from a different earlier set of experiments, but if he does not have good records, he may not be able to locate or reproduce the earlier set of experiments.

Furthermore, often a data scientist may be able to benefit from data models developed for other applications, even if just as an initial starting point. These may be other data models developed by the data scientist himself or developed by others. However, it can be difficult to determine whether or which data models might be relevant. Even if the data scientist could identify relevant data models, the data models might not be in a form ready for further development. For example, the details or implementation of the data model might be lost, so that the data scientist would have to recreate the data model.

Thus, there is a need for better approaches to developing data models.

SUMMARY

The present disclosure overcomes the limitations of the prior art by providing a platform for developing data models. The platform includes a repository for kernel images, a data store of data sets and a development environment. The kernel images include a data model and configurable development code for running experiments and generating the data model. The development of the data model is configurable according to development parameters for the development code. The kernel images specify the development parameters in a standardized syntax for the platform and specify the input data using standardized data types for the platform, preferably via a standardized API. The development environment is used to run experiments to develop the data models. Each experiment runs one of the kernel images, according to a configuration of the development parameters for the kernel image, and using one or more of the data sets in the data store as input data.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
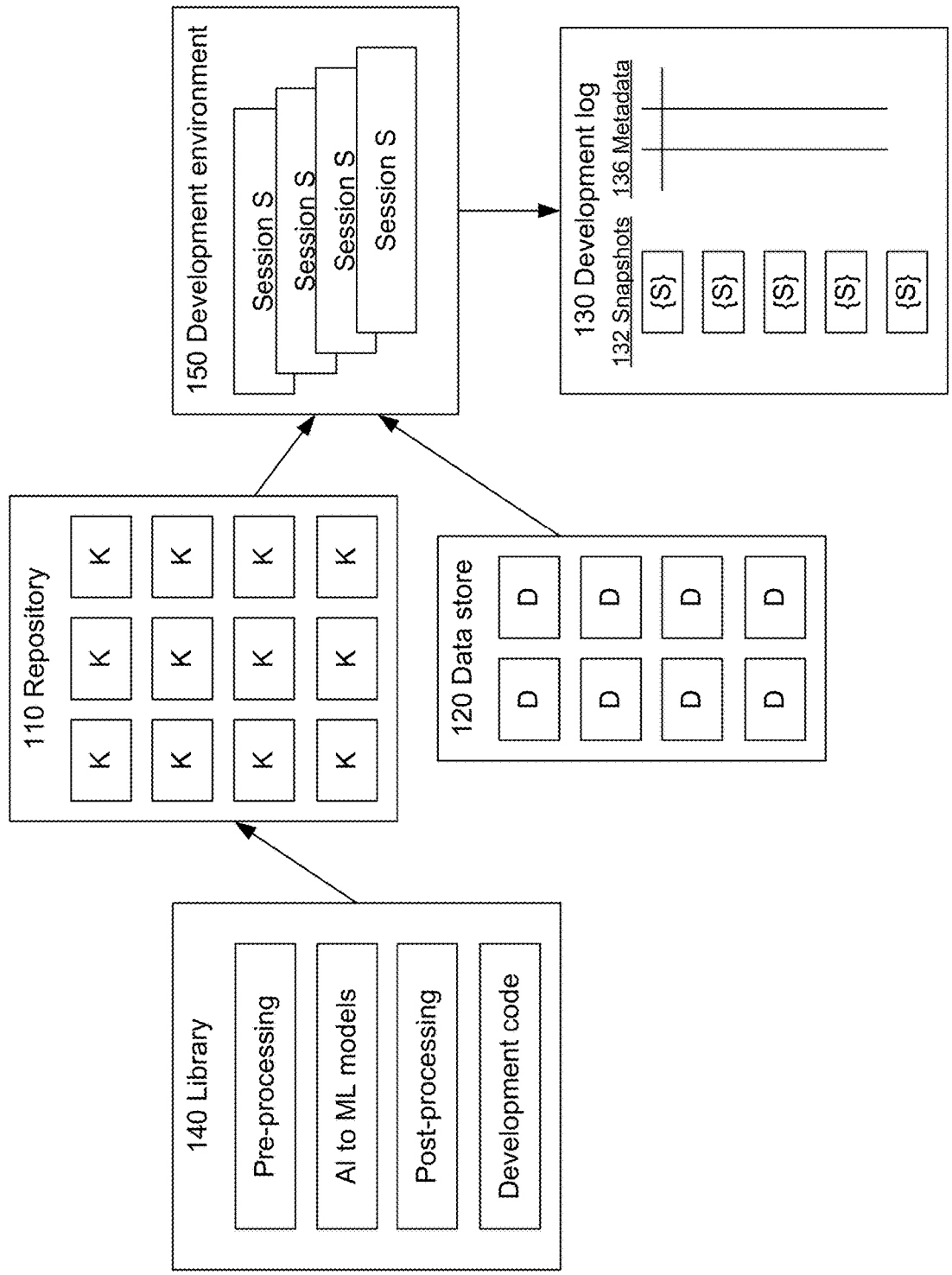
FIG. 1 is a block diagram of a development platform according to the invention.

FIG. 1 is a block diagram of a platform for developing data models according to the invention. A data model is used to model some application and it estimates the output resulting from the input applied to the data model. One use of data models is classification of data objects, such as images, text, sound, sensor signals and others, for example predicting the occurrence of cancer based on a deck of CT images. Another use is detecting and localizing interesting features within data objects, for example, to detect and localize the tumor within the CT images. Another use is to transform a data object into another form, for example to convert a CT image whose pixels are grayscale values into a label image whose pixels are categorical value indicating the type of tissue. That is, the data model predicts the type of tissue for each pixel: bone, soft tissue, blood, etc. Some final examples are to convert an audio clip of speech into corresponding text, and to convert text of one language into another language.

The development platform includes a repository 110 that contains kernel images K, a data store 120 that contains data sets D, a development log 130, a library 140 and a development environment 150. The kernel images K include data models and development code used to run experiments and generate and train the data models. The development code is configurable according to parameters, which will be referred to as development parameters. The data sets D are used as input data to develop the data model. The actual development of the data model occurs through experiments that are run in the development environment 150. In this example, the data scientists run sessions S, which may include one or more experiments. Each experiment runs a kernel image K, according to a configuration of the development parameters, and using one or more of the data sets D as input data to the kernel image. The results of the experiments and the development of the data model over time are recorded in the development log 130. In this example, the development log 130 includes snapshots 132 of the experiments and metadata 136 used to track the experiments and the development of the data model.

In one example, the data model is a machine learning model. The development code is code that is used to train and evaluate the performance of the machine learning model. For example, the development code may implement back-propagation or other training algorithms. The development parameters might be the number of training iterations, some other criteria for when to stop iterations, a learning rate, and a regularization coefficient. In the case of artificial neural networks, the development parameters may include the number of layers in certain sub-networks, and the number of neurons in certain layers. In case of a decision tree, or a random forest of multiple decision trees, the maximal depth of a tree and the number of trees may be development parameters. The machine learning model is trained by supervised learning using tagged data sets D from the data store.

The kernel image, which contains both the machine learning model and the training and evaluation code, is stored as a virtual machine snapshot. The kernel image is a package of code and its dependencies in the form of a virtual machine image, so it can be run again in the same controlled environment. In some embodiments, the kernel image is a docker image. Alternatives include other, maybe more heavy-weighted, virtual machine images. The kernel image exposes the development parameters using a syntax that is standardized for the platform. The syntax allows the developer to specify the type and range or choices of the development parameters and, optionally, one or more preferred values to be experimented with. Similarly, it specifies the data type for the input data using data types that are standardized for the platform, but it does not specify which specific data sets to use.

An experiment is created by instantiating the virtual machine snapshot of the kernel image. A configuration for the selection of development parameters (i.e., not the values of the development parameters, but how the platform should generate these values when multiple combinations are possible) and the actual data set to be used in the experiment are defined. For example, the configuration may be submitted as a textual config file. In another embodiment, the configuration is done via a web user interface. The configuration of development parameters may also be determined automatically by the development environment. The development parameters and input data types are defined by the kernel image through a standardized API, and the selected values for the development parameters are fed into the kernel at runtime via the API.

As the machine learning model is developed, the development environment 150 tracks various quantities that are recorded or stored in the development log 130. For example, the development log may store snapshots 132 of the experiments or sessions S, including an identifier of the kernel image version. One embodiment implements the identifier with UUID. The information in the development log may be organized in a manner that reflects the development effort. In an embodiment, it may have a tree structure in which different branches represent different development paths from a common starting point. The development environment may also support user annotation of the experiments so that the data scientist can record notes about the development in the log.

The development log may also include other metadata 136 such as performance metrics or compute costs for the experiments. Examples of performance metrics include true positive rate, false positive rate, precision, accuracy and other metrics for accuracy, inference speed (how much time to process the input and generate a prediction) and memory cost. Examples of compute cost include runtime, processor usage, and memory usage. In this way, development of the data model can be tracked in a more systematic and reproducible manner.

The library 140 contains components that may be useful for developing data models. For example, it may contain templates that wrap popular software such as scikit-learn, common models built with tensorflow, keras, and pytorch. It may also contain templates of components used to build data models, including pre-processing components and post-processing components. It may also include templates of development code or components for development code. These templates may be provided in the form of kernel images which can be built upon.

Now consider the kernel image in more detail. Appendix A contains example source code from a kernel image. This source code is from the configurable development code. The development parameters are defined by the iai.param_placeholder and iai.function_placeholder statements, which are part of the API. The iai.param_placeholder statement allows the data scientist to define a development parameter with possible values. Lines 15-17 give several examples of this. Lines 15 and 16 define the development parameters "xgb.iterations" (Line 15) and "xgb.depth" (Line 16). The possible choices of the values for these development parameters are listed. These statements indicate the "xgb.iterations" parameter can choose from two possible values: 100 and 200, and "xgb.depth" from values 1, 2 and 4. Line 17 defines the development parameter "xgblearning_rate." The possible values for this development parameter are defined by a range ("min" and "max") and increment step ("delta"). This indicates that "xgblearning_rate" can choose from five values: 0.1, 0.2, 0.3, 0.4 and 0.5. A default value of the development parameter may also be provided and optionally "priority_choices" may be added to specify the "must-try" values the platform has to experiment with in brute force search before other search strategies are applied. In the case of "xgb.iterations", the "priority_choices" are also the "choices" as no other information is given.

The iai.function_placeholder statement defines a development parameter not by its possible values, but by a function that does a required type of data conversion. For example, this might be a pre-processing step in the data model. In Line 37, a function that converts input type "iai.text" to output type "iai.features" is required. The platform searches its library to find functions that match the required type conversion. These form the possible choices of the value that is assigned to the variable "prep" in different experiments. A name ".prep" is provided to this placeholder without a prefix like "xgb". A name starting with "." means this placeholder is specific to this particular kernel and is not to be considered for performance estimation in other kernels.

The platform provides a library of functions with well-defined input and output data types, with which methods of required data conversion can be composed and provide choices to iai.function_placeholder statements. More such functions may be defined by the user to enlarge the search range.

In the example of Appendix A, Line 62 and Line 68 define the functions tokenize1 and tokenize2 that convert data type "iai.text" (strings of text) to data type "iai.words" (lists of words, with punctuation and possibly non-informative common words (stop words) removed). Line 73 and Line 79 define functions vectorize_LDA and vectorize_pLSA to convert "iai.words" to "iai.features" (feature vectors suitable for feeding into machine learning methods like xgboost). For the conversion of "iai.text" to "iai.features" required by the iai.function_placeholder statement in Line 37, four possible chains of registered functions can be found: (1) tokenize1+vectorize_LDA, (2) tokenize1+vectorize_pLSA, (3) tokenize2+vectorize_LDA, and (4) tokenize2+vectorize_pLSA. In each chain, the output type of a previous function matches the input type of the next function. The successive application of functions in a chain achieves the effect of converting the input type of first function to the output type of last function. The platform provides standard data type IDs like "iai.text", "iai.words" and "iai.features". The developers may also define their own data types.

Each registered function is provided a priority value. Smaller number means higher priority. The priority of the full chain is the summation of all priority values of all functions in this chain. When too many possible chains are found, the alternatives are prioritized by their priority value, and only the top K are considered, with a user-configurable K.

A similar approach can be used to expose to the platform the performance metric(s) for the model development. Typically in model development, some performance metric is used to both evaluated the performance of the current model and to provide feedback for further developing the data model. Examples of performance metrics include true positive rate, false positive rate, precision, accuracy and inference speed. For example, Line 55 in Appendix A exposes to the platform a performance metric called "log_loss." The exact meaning and implementation of the performance metric may be defined by the developer, and the platform only has to know whether higher or lower value means better performance. For example, the performance metric may be a weighted sum of different terms, where the weight is a parameter for the performance metric. In Line 55, the "+" sign means bigger value is better, and a "−" sign would mean smaller value is better.

When the kernel image is instantiated to run multiple experiments, the platform uses a strategy to assign actual parameter values for each of the placeholders. In one strategy, the first experiment is assigned default values to all placeholders. Then, the values are assigned as a combination of default values and priority choices. If more experiments are run, the platform uses a perturbation-based strategy to generate more combinations of development parameters.

In addition to development code, the kernel image also contains the data model being developed. The data model receives certain input data (e.g., CT images) and produces output data (e.g., a prediction of whether the patient is cancerous). The actual input data is not incorporated in the kernel image and will be drawn from the data sets in the data store.

Figure 2:
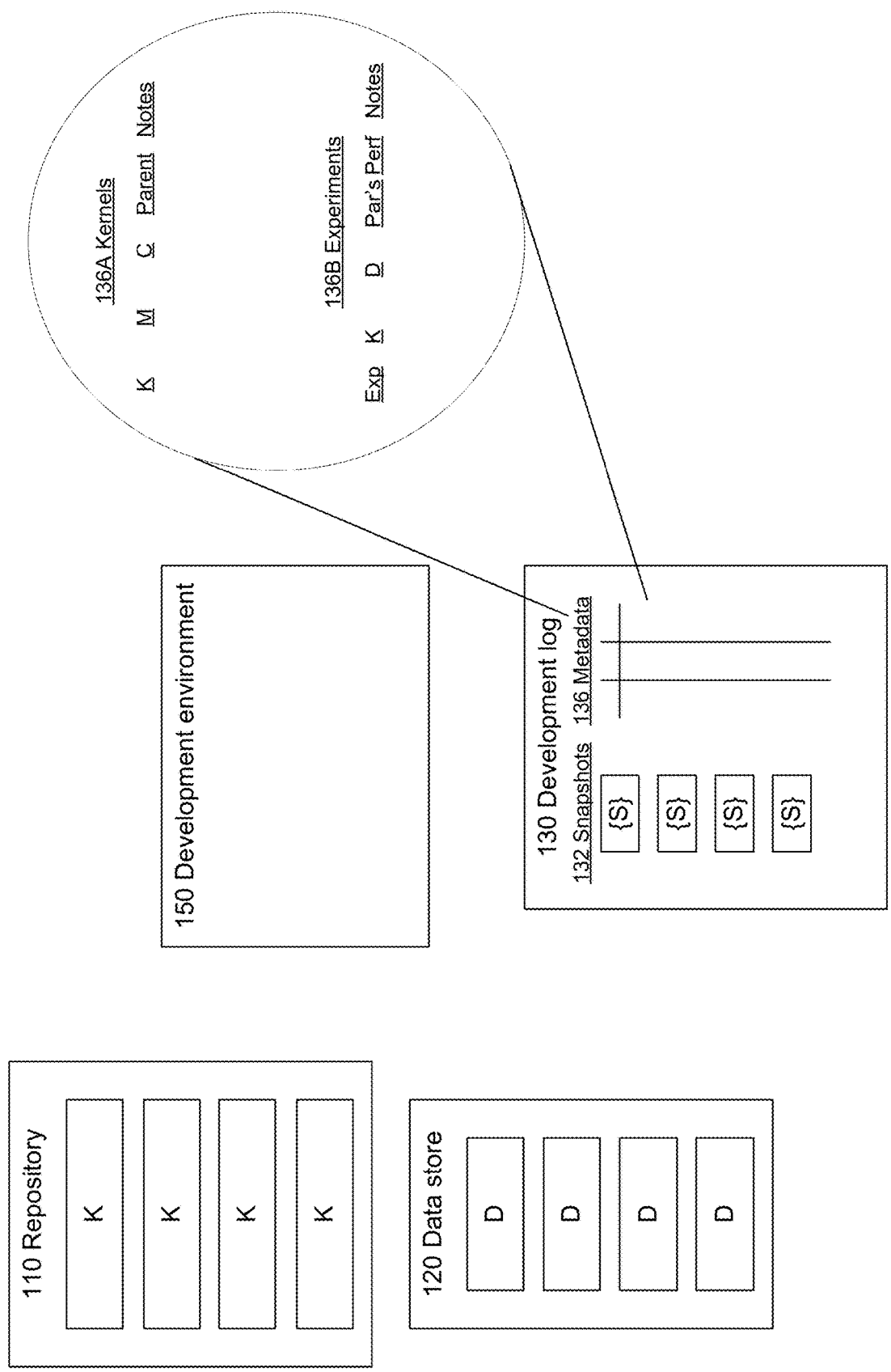
FIG. 2 is a block diagram of a development platform used to show development of a data model.

FIGS. 2-3 illustrate use of the development platform. FIG. 2 is similar to FIG. 1, except that the library 140 is not shown and the metadata 136 includes one table 136A for tracking kernel images and another table 136B for tracking experiments.

Figure 3A:
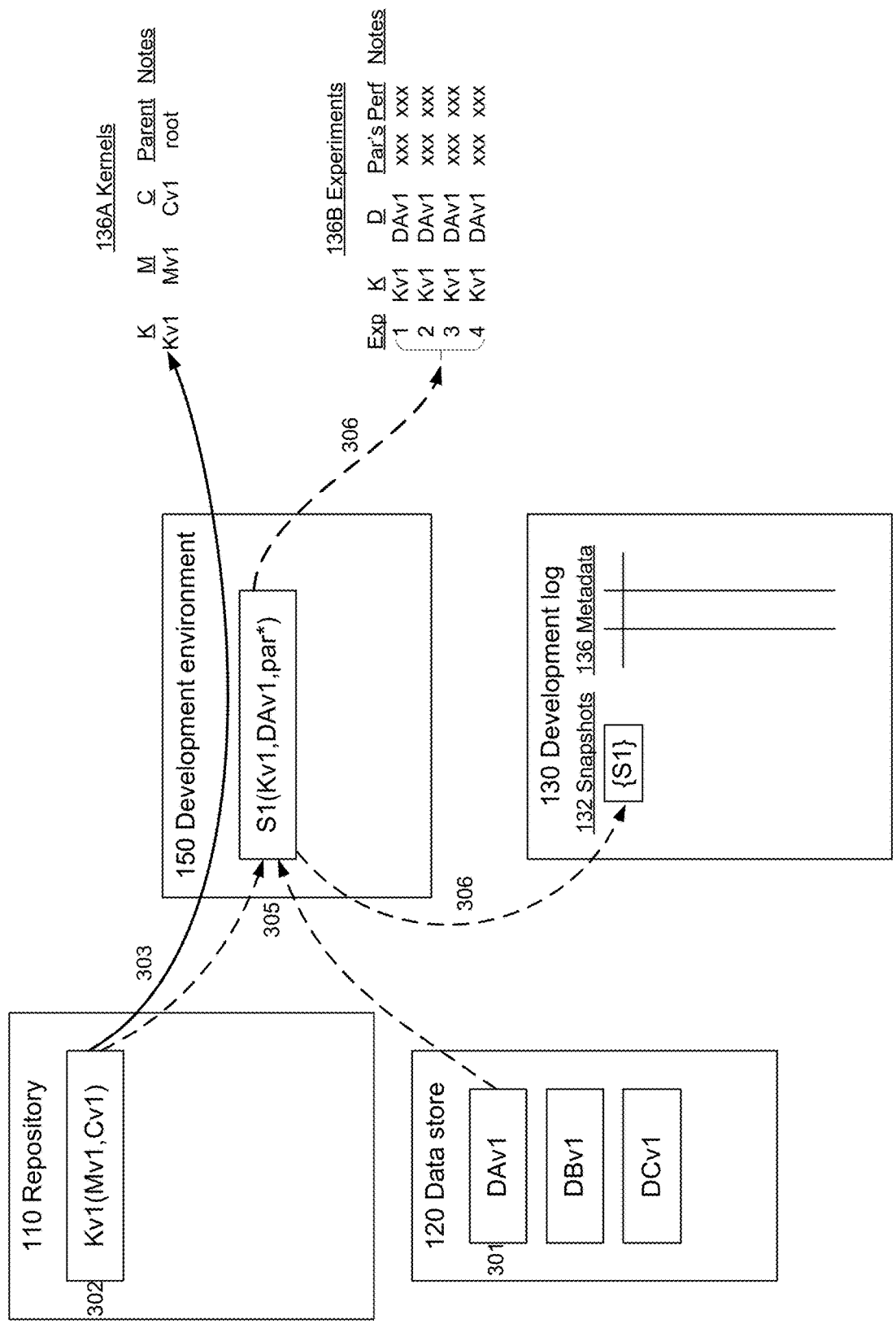
FIGS. 3A-3D show development of a data model using the development platform of FIG. 1.

FIGS. 3A-3D illustrate an example starting from FIG. 2. In FIG. 3A, a data scientist wants to develop a data model for some application. The data model receives X as input and produces Y as output. The data scientist has access 301 to a number of data sets DAv1, DBv1, DCv1 which have examples of data inputs X and corresponding data outputs Y. Here, the A, B, C denote different data sets A, B and C, and the v1 stands for version 1. The data scientist produces 302 a first kernel image Kv1. He may use components from the library to produce the data model Mv1 (model version 1) and the development code Cv1 (development code version 1) in kernel image Kv1 (kernel version 1). The notation Kv1 (Mv1,Cv1) means that kernel image Kv1 includes data model Mv1 and development code Cv1. The platform trackd the kernel version which implicitly specifies all details of the model and development code. The version number of model and code is for illustration only.

Metadata for the kernel image Kv1 is recorded 303 in the development log 130. In this example, the metadata 136 in the development log includes one table 136A for tracking kernel images and another table 136B for tracking experiments. In table 136A, each row is for a different kernel image. Col K is the kernel image, col M is the data model in the kernel image, col C is the development code in the kernel image, col Parent shows the evolution of the kernel image, and Notes allows the user to add notations. Here, the Parent=root because kernel image Kv1 is the initial kernel image.

The data scientist runs 305 a session S1, which runs a number of experiments using the kernel image Kv1 using the data set DAv1 as input. In one approach, the configuration for the development parameters is fixed and the session S1 runs one experiment with just that configuration. In an alternative approach shown in this example, the development environment runs the training multiple times using different configurations of the development parameters. In the notation for session S1, par1 would indicate a fixed configuration and par* indicates a situation where the development environment automatically selects and runs different configurations. In the figures, the notation S1(Kv1, DAv1,par*) indicate the kernel image, data set and parameter configuration used for a session.

Figure 4:
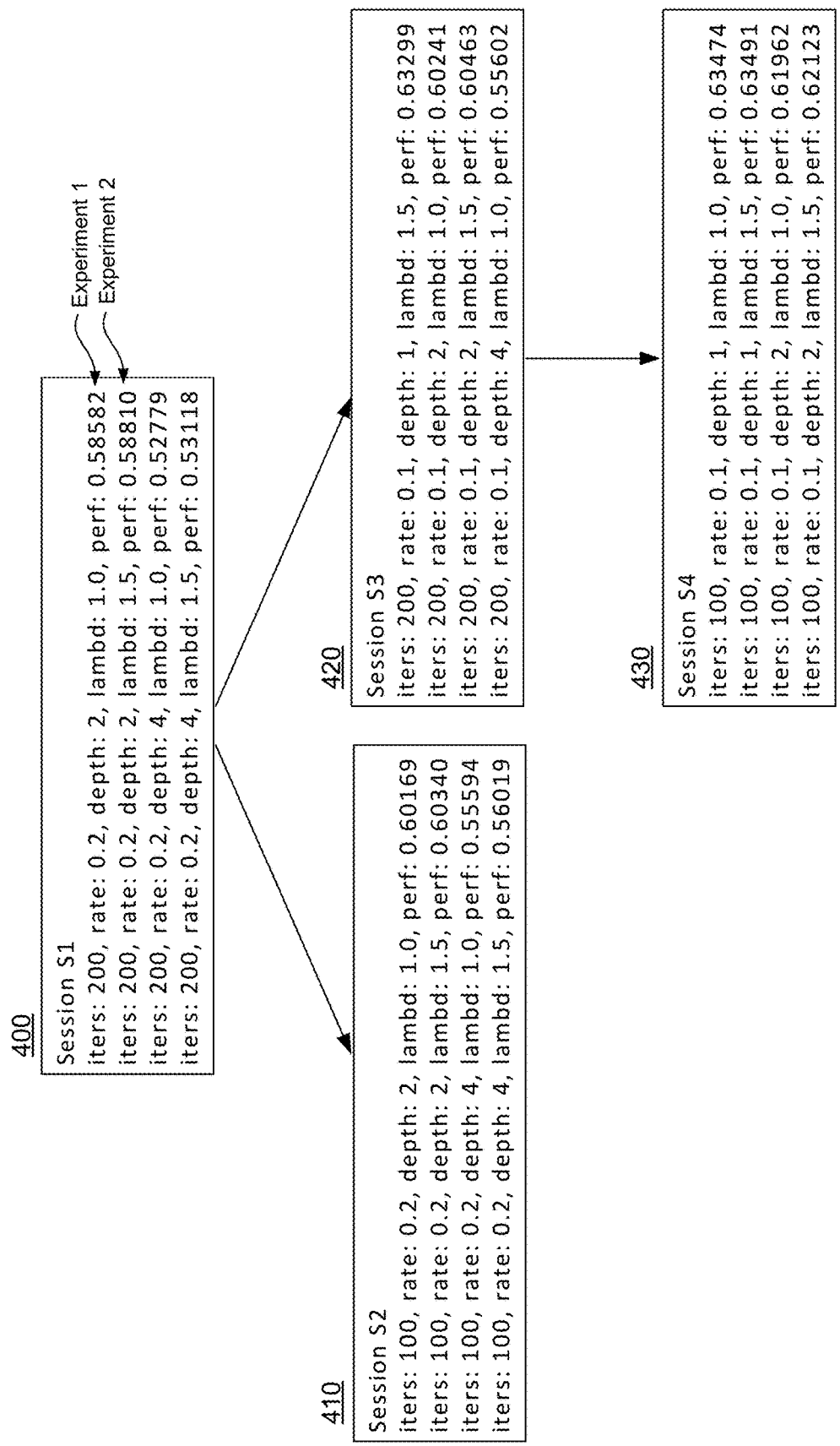
FIG. 4 shows reporting for the development of FIG. 3.

The development environment may report the different experiments as shown in FIG. 4. Report 400 shows the experiments for session S1. In this session, the development parameters iters and rate are held constant but depth and lambd[a] are varied. Perf is the performance metric. Each row represents a different experiment. In this example, the experiments are labelled consecutively: 1, 2, etc. Here, the second run (experiment 2) produces the highest performance metric perf=0.5881.

The development environment also records the experiments 1-4 in the development log, for example saving 306 a snapshot of S1 and also recording 306 the results of each individual experiment 1-4 in table 136B of FIG. 3A. In table 136B, each row corresponds to one experiment. Col Exp is the experiment ID, cols K and D are the kernel image and data set for that experiment, col Par's list the parameter values for that experiment, col Perf is the value of the performance metric for that experiment, and Notes allows the user to add notes.

Figure 3B:
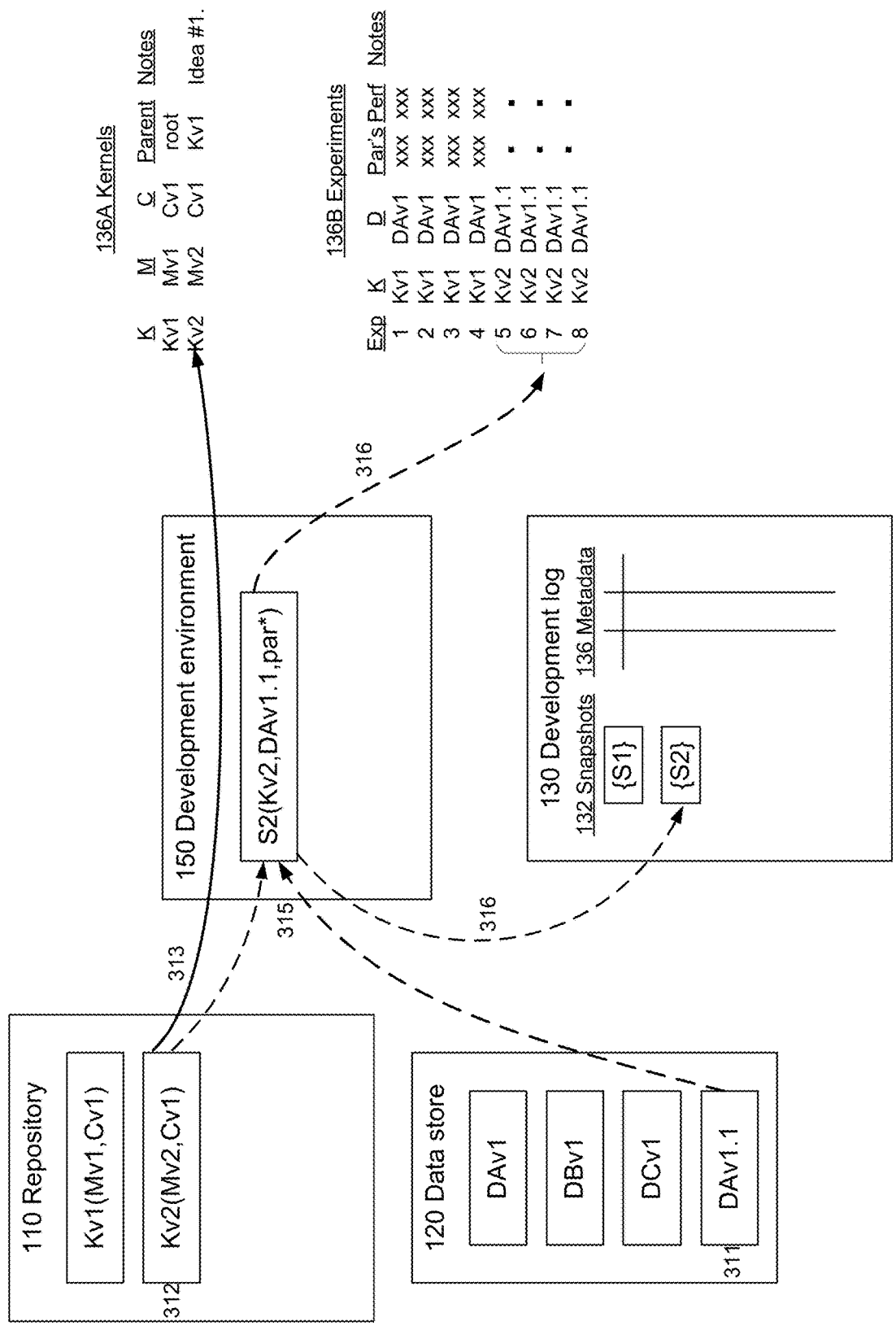

Based on the results of session S1, the data scientist has two ideas for improving the data model. He tries one of the ideas, as shown in FIG. 3B. He revises the data model to version 2, denoted as Mv2. This results 312 in a new kernel Kv2(Mv2,Cv1), which uses the revised data model Mv2 and the same development code Cv1. This new kernel Kv2 is recorded 313 in table 136A. Note that the Parent=Kv1. Session S2 runs 315 the new kernel using the same data set DA as before, except that new samples have been added 311 to the data set to create a new version 1.1. In FIG. 4, report 410 shows the results of these four experiments 5-8, which are also recorded 316 in the development log. The best performance metric is perf=0.6034, which is an improvement over session S1.

Figure 3C:
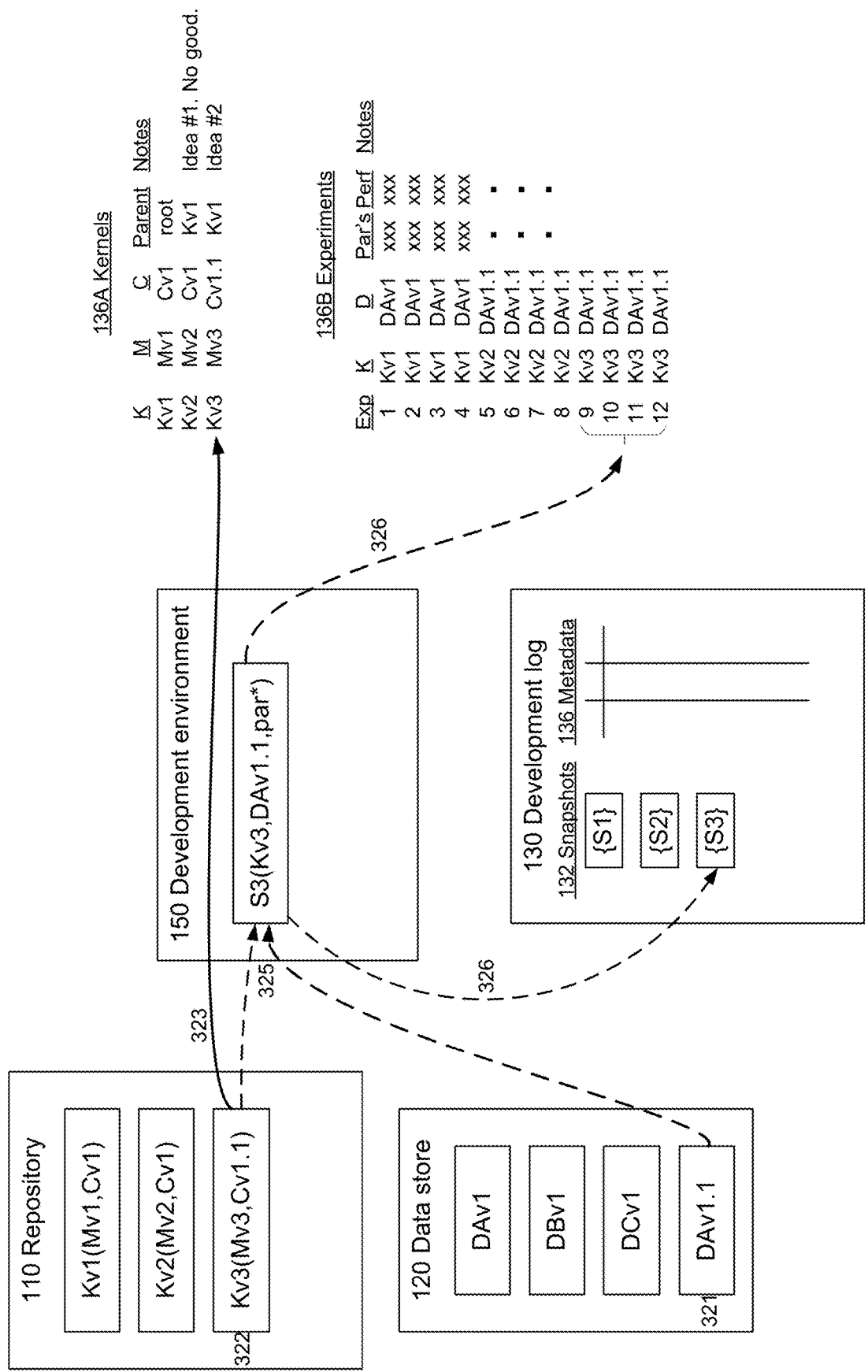

The data scientist now tries the other idea as shown in FIG. 3C. He revises the data model to version 3, denoted as Mv3, which also requires a slight change in the development code to version 1.1. This results 322 in a new kernel Kv3(Mv3,Cv1.1), which uses the revised data model Mv3 and revised development code Cv1.1. Note that the entries 323 for kernel Kv3 also indicate Kv1 as the parent. Session S5 runs 325 experiments using the new kernel and the data set DA version 1.1. Report 420 in FIG. 4 shows the results of these experiments, which are also recorded 326 in the development log. The best performance metric is perf=0.6330, which is the highest performance so far. As a result, the data scientist also annotates Kv2 as "No good."

Figure 3D:
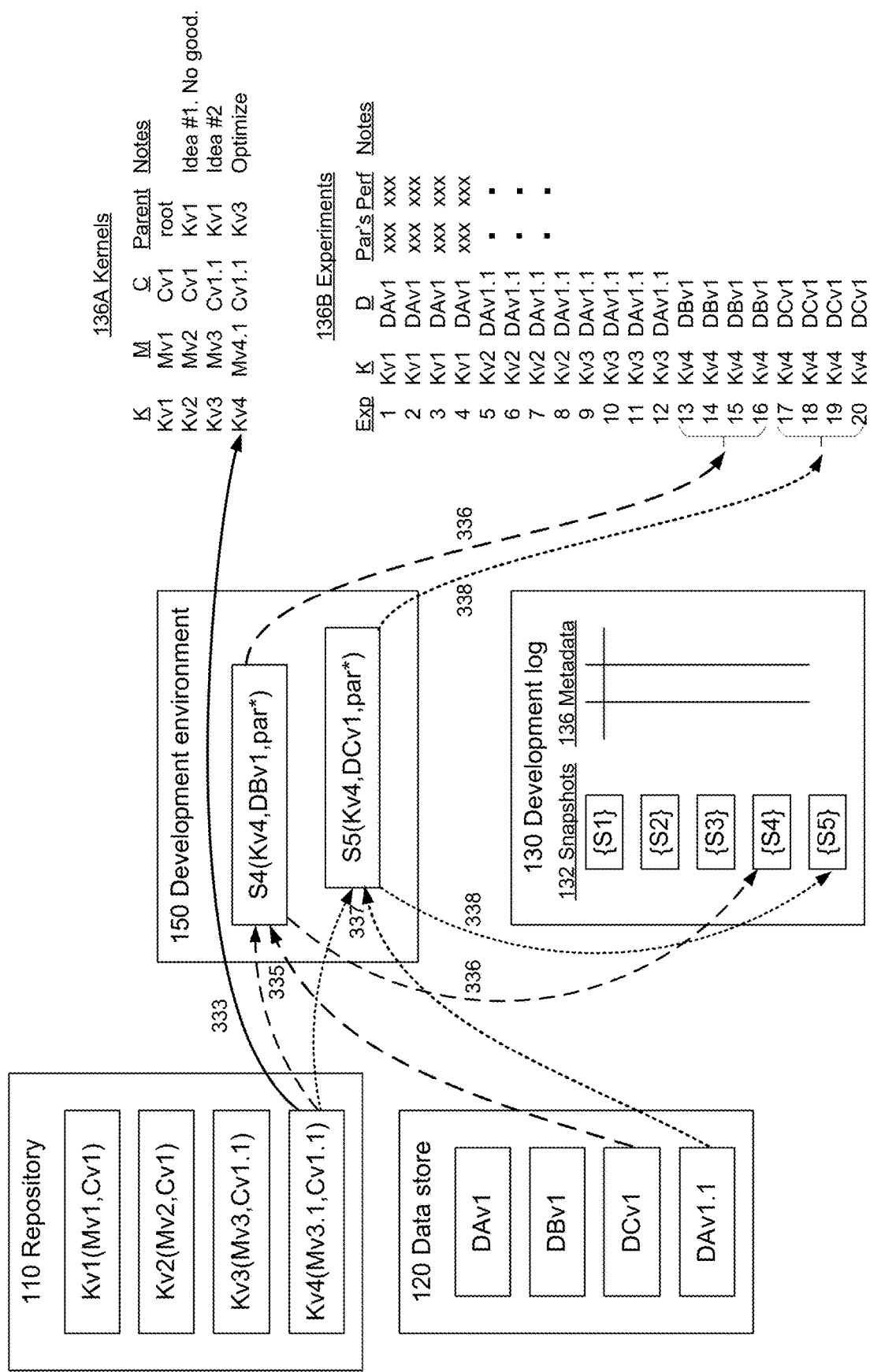

Based on that result, the data scientist further refines the data model to version 3.1, as shown in FIG. 3D. The new kernel image 332 is Kv4(Mv3.1,Cv1.1). In table 136A, it is derived from Kv3. Because the changes are not that significant, the data scientist does not retrain using the same data set A. Rather, session S4 runs 335 the kernel image Kv4 using data set DB. In parallel, session S5 runs 337 the same kernel image but using data set DC. The results of sessions S4 and S5 are recorded 336, 338 in the development log. Report 430 of FIG. 6 also shows the results of session S4.

In this example, the development platform facilitates the development of data models. The library 140 provides components so that the data scientist can more quickly create and revise data models and development code. The platform tracks different versions of the data models, development code, kernel images and data sets. The platform also tracks the development process. For example, the tables 136A,B in the development log record the development path for the data model, so it is easier for the data scientist to review what has happened in the past. The experiment snapshots 132 allow the data scientist to quickly revert to or replay an earlier version. The tables, snapshots and other information shown in FIGS. 3 and 4 may be made accessible from a web user interface or from a command line interface.

This data may also be used to accelerate the development. For example, if the development environment is selecting or optimizing the configuration for the development parameters, it may estimate the performance metric for different possible configurations based on the past performance of previously run experiments (col Perf in table 136B of FIG. 3). These estimates may be used to prioritize the configurations. They may also be used to decide whether or not to run certain configurations.

Other strategies may also be used to automatically select or prioritize configurations. One approach is exhaustive search, where all possible configurations (or all feasible configurations) are tried. Another approach is perturbation-based. The search starts from one or more default or must-try configurations. From this initial set of configurations, new configurations are considered by perturbing one development parameter at a time. The new configurations may be run without further consideration, or they may be further qualified based on other factors, for example estimated performance. This continues until a stopping criteria is met. Typical stopping criteria are when a desired performance is achieved, when no further performance improvement or not enough performance improvement is observed, or when a limit on resources is reached (e.g., maximum number of iterations or maximum processor cycles).

Figure 5:
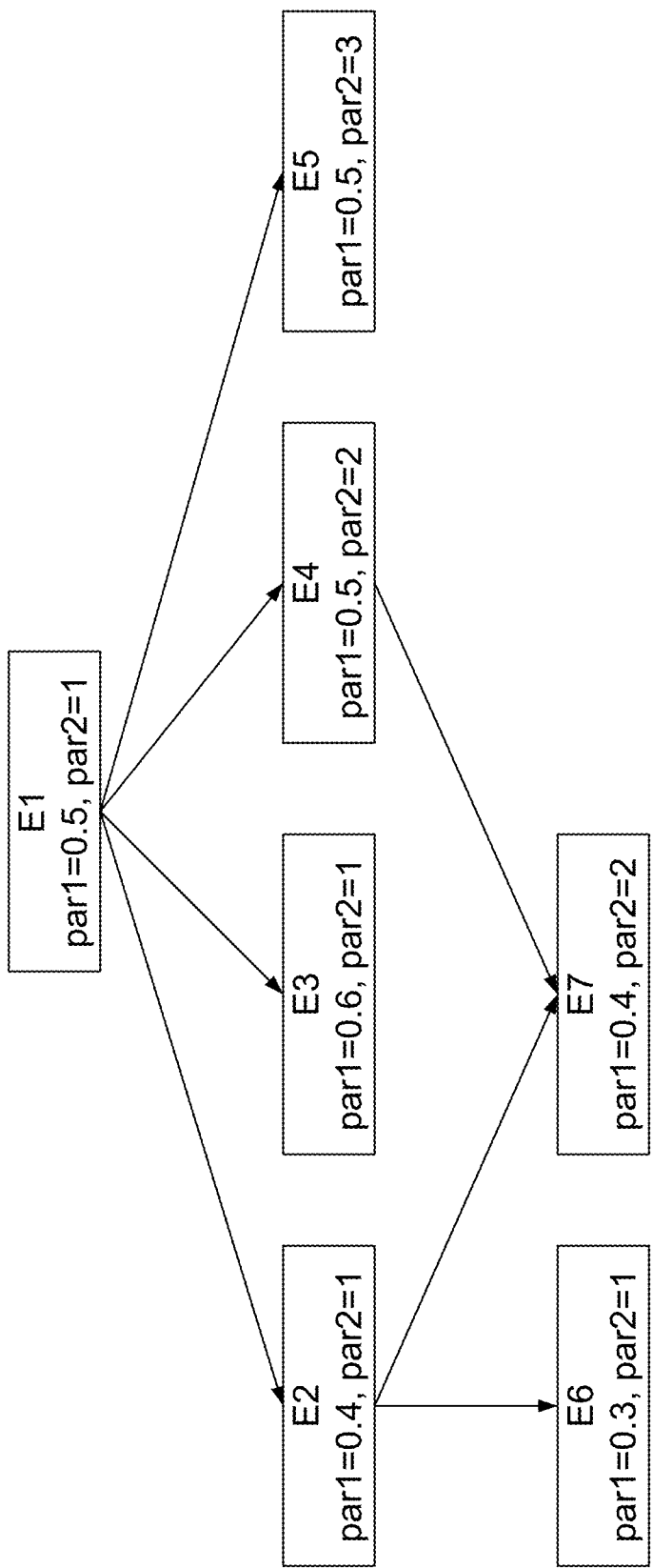
FIG. 5 shows a perturbation-based approach to optimizing development parameters.

FIG. 5 shows an example of the perturbation approach. In this example, there are two development parameters: par1 and par2. Experiment E1 is run with the default values par1=0.5, par2=1. From this point, four additional experiments E2-E5 are considered. In experiments E2 and E3, par1 is perturbed while par2 is held constant. In experiments E4 and E5, par1 is held constant while par2 is perturbed. Assume that experiment E2 has the best performance, E4 is next, and experiments E3 and E5 are not worth further consideration. From these results, new experiments E6 and E7 are considered. Experiment E6 is a further perturbation of par1 from experiment E2 in the same direction as E2. Experiment E7 is a perturbation of par2 from experiment E2, in the direction suggested by experiment E4. This is just one example. Other approaches to multi-variate optimization may be used.

In addition, not all candidate experiments need be actually run. Instead, their performance could first be estimated and the performance estimates used to prioritize or select which experiments to run. The development log contains historical data of performance as a function of configuration over many experiments. However, the experiments may be for different kernel images and/or different data sets. Thus, they may not be directly comparable. In one approach, relative metrics are used. Let P be a pool of experiments run in one session, all using the same (or substantially similar) kernel image and data set. The development log may contain data for many pools P(n), where n is just an index. Define the following for each pool P and performance metric perf:

$S(P)$=standard deviation of perf over the entire pool $P$ $E(\text{par1}=a,P)$=average perf for all experiments in $P$ with par1=$a$ $$\Delta(\text{par1}=a \to b, P) = [E(\text{par1}=b,P) - E(\text{par1}=a,P)]/S(P) \quad (1)$$

Roughly, $\Delta(\text{par1}=a \to b, P)$ is the change in average perf due to changing par1 from $a$ to $b$, normalized by the standard deviation of the entire pool.

Now assume we want to estimate $\Delta(\text{par1}=a \to b, P')$ for a given pool P' (i.e., for a given kernel image and data set), based on historical data for other pools P(n) (i.e., based on experiments run for other kernel images and/or data sets). One estimate is given by $$\Delta(\text{par1}=a \to b, P') = \Sigma w(n) \Delta(\text{par1}=a \to b, P(n))/\Sigma w(n) \quad (2)$$

That is, $\Delta(\text{par1}=a \to b, P')$ is a weighted sum of the $\Delta(\text{par1}=a \to b, P(n))$ for other pools P(n). The weights w(n)

are based on similarity between the pools P' and P(n), that is, based on the similarity between the kernel images and data sets. From Eqn. 1 above, the actual performance at par1=b can be estimated as $$E(\text{par1}=b,P)=E(\text{par1}=a,P)+S(P)*\Delta(\text{par1}=a\rightarrow b,P) \quad (3)$$

A similar approach may be used with respect to compute costs. Each experiment requires certain compute resources to run. Those compute costs may also be tracked and recorded in the development log, for example by adding another column in table 136B. The development environment may then estimate compute costs for different possible configurations based on the observed compute costs of previously run experiments. These estimates may be used to prioritize the configurations. They may also be used to decide whether or not to run certain configurations.

As a final example, when the data scientist is first developing the data model, he may search the prior models and/or kernel images including the templates provided by the platform and the accessible kernels shared by other users. Search is conducted by key words in associated textual description provided by the developer and textual description of data sets used to run the kernel images. Such descriptions usually include the type of data the kernel works with, the type of prediction that is made, and what methods are used. Kernel images that match may be good starting points for the data model under development.

In some implementations, the platform supports shared usage by multiple users. For example, it can be provided on a cloud basis or as a service. In that case, the platform will also implement restricted access. For example, certain kernel images, data sets and library components may be proprietary, for use by only certain users. Other users would not have access. At the other extreme, certain kernel images, data sets and library components may be public—accessible by many or all users.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

APPENDIX A

Sample Source Code for Configurable Development Code

```
1  #!/usr/bin/env python3
2  import xgboost  # An embodiment of machine learning method called "xgboost"
3  from sklearn.metrics import log_loss
4             # An embodiment of performance metric called "log_loss".
5  import iai      # patent related functionality are all with an "iai." prefix in this illustration.
6
7  params = {
8      # Illustration of development parameter placeholders.
9      # In actual experiments, invocation of iai.param_placeholder will return actual values to be
10     # used in place of the placeholders.
11     # The parameter name is to follow a starndard format. All "xgboost" related parameters
12     # have a prefix "xgb.". If "xgb.iterations" appears in another kernel, it's supposed to mean
13     # the same parameter of the xgboost method.
14     # The actual values taken by the placeholders will be recorded in the log.
15     'n_estimators': iai.param_placeholder(name='xgb.iterations', priority_choices=[100,200], default=200),
16     'max_depth': iai.param_placeholder(name='xgb'.depth', choices=[1,2,4], default=2),
17     'learning_rate': iai.param_placeholder(name=xgb.learning_rate', min=0.1, max=0.5, default=0.2, delta=0.1),
```

APPENDIX A-continued

Sample Source Code for Configurable Development Code

```
18      'objective':'binary:logistic',
19  }
20
21  # The platform will supply the data here.
22  # the exact data used is specified by the developer
23  # in config file at experiment run time.
24  X = iai.data['train']['data']      # data here is text
25  Y = iai.data ['train'] ['target']
26
27
28  # Illustration of function placeholder.
29  # the system will search the function library to find chains
30  # of registered functions, whose consecutive application will
31  # achieve the effect converting input data type of "iai.text" to
32  # output data type "iai.features".
33  # "iai.text" and "iai.features" are data type IDs defined by the platform.
34  # Developer can define their own data type IDs.
35  # At each experiment, one of the chains found will be supplied by the platform to
36  # take the place of placeholder.
37  prep = iai.function_placeholder(name='.prep', input_type=iai.text,
    output_type=iai.features)
38
39  X = prep(X)      # convert text to features
40
41  # create and train the xgboost model using the parameters and training data.
42  model = xgboost.XGBClassifier(**params)
43  model.fit(X, Y)
44  # model can be optionally saved here for deployment.
45
46  # Model
47  X = iai.data['val'] ['data']
48  Y = iai.data ['val'] ['target']
49  X = prep(X)      # the same preprocessing as training data.
50  pred = model.predict_proba(X)[:, 1] # prediction
51  perf = log_loss(Y, pred)           # performance valuation
52
53  # reporting performance of a performace metric called "log_loss".
54  # the name and actual meaning are fully up to the developer.
55  iai.report(name='log_loss', value=perf, sign='+')
56
57  ###########################################################
58  # Illustration of how functions can be defined and registered to the platform,
59  # so it can be automatically searched in "functional" placeholders.
60
61  @iai.register(priority=1)
62  def tokenize1 (X: iai.text) -> iai.words:
63      # "iai.text" and "iai.words" specify the input and output type of registered function
64      # simply split text by spaces and remove punctuations
65      pass
66
67  @iai.register(priority=2)
68  def tokenize2 (X: iai.text) -> iai.words:
69      # like tokenize1, but also removes stop words.
70      pass
71
72  @iai.register(priority=2)
73  def vectorize_LDA (X: iai.words) -> iai.features:
74      # implementation of LDA, Latent Dirichlet Allocation
75      # return extracted feature vector
76      pass
77
78  @iai.register(priority=1)
79  def vectorize_pLSA (X: iai.words) -> iai.features:
80      # implementation of pLSA, Probabilistic Latent Semantic Analysis
81      # return extracted feature vector pass
82      pass
```

What is claimed is:

1. A platform for developing data models, the platform comprising:
    a repository for storing kernel images, each kernel image comprising:
    a data model that receives input data and produces output data;
    configurable development code for developing the data model, wherein the development of the data model is configurable according to development parameters for the development code; and
    a specification of the development parameters in standardized syntax for the platform; and
    a data store for storing data sets; and
    a development environment for running experiments to develop the data models; each
    experiment running one of the kernel images, according to a configuration of the development parameters for the kernel image, and
    using one or more of the data sets in the data store as input data,
    wherein the development environment automatically tracks and execute the development of the data model by tracking different versions of the model, the development code and/or the data sets used in the development.

2. The development platform of claim 1 wherein the data model is a machine learning model, the data set is a tagged data set, and the development of the data model is a supervised training of the machine learning model using the tagged data set.

3. The development platform of claim 1 wherein the development parameters are exposed through a standardized API.

4. The development platform of claim 1 wherein the kernel image further comprises a specification of a performance metric parameter in standardized syntax for the platform.

5. The development platform of claim 1 wherein the kernel images are stored in the repository as virtual machine snapshots.

6. The development platform of claim 1 further comprising:
    metadata that tracks the development of the data model, wherein the metadata has a tree structure.

7. The development platform of claim 1 further comprising:
    a development log that records compute costs and performance metrics for the experiments that were run to develop the data model, wherein the development environment automatically tracks the compute costs and performance metrics for recordation in the development log.

8. The development platform of claim 1 wherein the development environment automatically runs experiments according to different configurations of the development parameters.

9. The development platform of claim 8 wherein the development environment optimizes the configuration of the development parameters.

10. The development platform of claim 8 wherein the development environment estimates a compute cost and/or a performance metric for experiments to be run according to different configurations and automatically prioritizes the different configurations based on the estimated compute costs and/or the estimated performance metrics.

11. The development platform of claim 8 wherein the development parameters define a function in the data model by input data type and output data type, and the development environment automatically searches for existing defined functions with the same input data type and output data type.

12. The development platform of claim 11 wherein the development environment automatically searches a library of existing defined functions.

13. The development platform of claim 11 wherein the development environment automatically searches user-defined functions.

14. The development platform of claim 1 wherein multiple users have access to the development platform and the development platform restricts each user's access to the proprietary kernel images and data sets of other users.

15. The development platform of claim 14 further comprising:
    a library accessible by many users, the library containing templates of at least one of:
    pre-processing components and post-processing components.

16. The development platform of claim 14 further comprising:
    a library accessible by many users, the library containing templates of development code.

17. The development platform of claim 1 wherein the different versions of the model are tracked as a tree structure.

18. A platform for developing data models, the platform comprising:
    a repository for storing kernel images, each kernel image comprising:
    a data model that receives input data and produces output data:
    configurable development code for developing the data model, wherein the development of the data model is configurable according to development parameters for the development code; and
    a specification of the development parameters in standardized syntax for the platform:
    a data store for storing data sets;
    a development environment for running experiments to develop the data models; each experiment running one of the kernel images, according to a configuration of the development parameters for the kernel image, and using one or more of the data sets in the data store as input data; and
    a development log that contains snapshots of experiments, wherein the development environment automatically running to executing tracks the development of the data model by capturing the snapshots of the experiments that were run to develop the data model.

19. The development platform of claim 18 further comprising:
    a development log that contains an index of the kernel images, the index indicative of the development of the data model.

20. A platform for developing data models, the platform comprising:
    a repository for storing kernel images, each kernel image comprising:
    a data model that receives input data and produces output data:
    configurable development code for developing the data model, wherein the development of the data model is configurable according to development parameters for the development code; and a specification of the development parameters in standardized syntax for the platform:
a data store for storing data sets;
a development environment for running experiments to develop the data models; each experiment running one of the kernel images, according to a configuration of the development parameters for the kernel image, and using one or more of the data sets in the data store as input data; wherein;
the development environment automatically running and executing experiments according to different configurations of the development parameters: the development parameters define a function in the data model by input data type and output data type, and the development environment automatically searches for existing defined functions with the same input data type and output data type; and
the development environment automatically searches for a chain of two or more existing defined functions wherein a first existing defined function in the chain has the same input data type as the function defined for the data model, each existing defined function in the chain has an output data type that matches the input data type of a next existing defined function in the chain, and the last existing defined function in the chain has the same output data type as the function defined for the data model.

* * * * *